(No Model.)
W. BEATSON.
RECOVERING TIN FROM WASTE TINNED IRON.
No. 352,603. Patented Nov. 16, 1886.
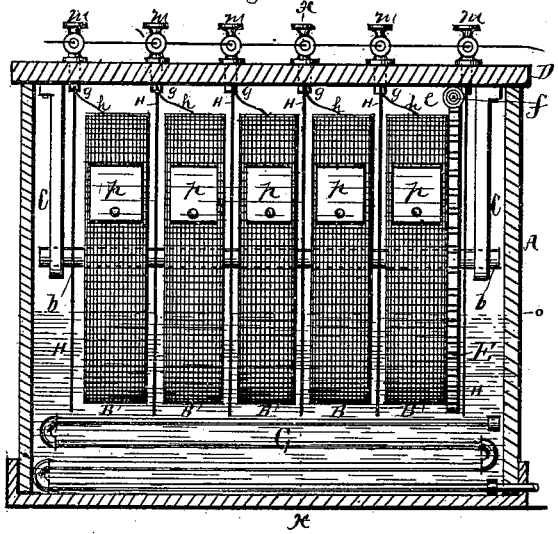
Fig. 1.
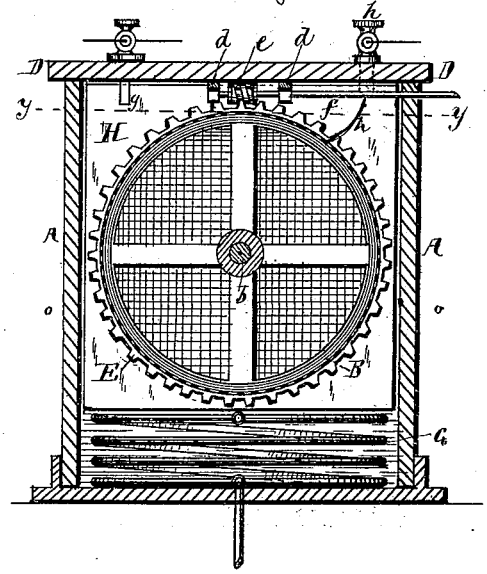
Fig. II.
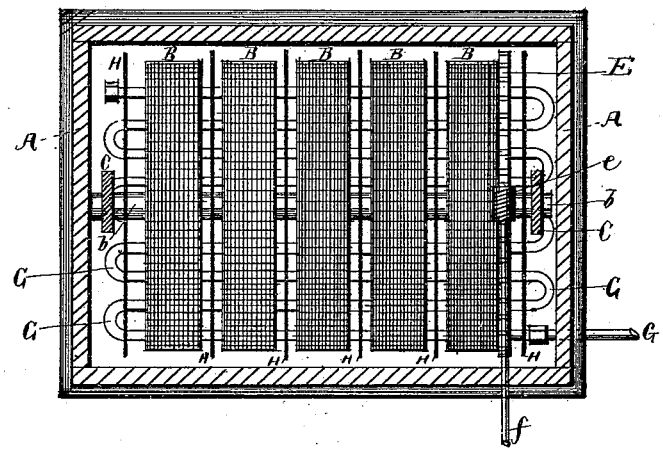
Fig. III.
WITNESSES:
F. Barrett.
B. Arthur Dahinger
INVENTOR:
William Beatson
PER:
James H. Lancaster
ATTORNEY.

UNITED STATES PATENT OFFICE.

WILLIAM BEATSON, OF ASH MOUNT, ROTHERHAM, COUNTY OF YORK, ENGLAND.

RECOVERING TIN FROM WASTE TINNED IRON.

SPECIFICATION forming part of Letters Patent No. 352,603, dated November 16, 1886.

Application filed May 5, 1886. Serial No. 201,124. (No model.) Patented in England January 7, 1884, No. 895.

*To all whom it may concern:*

Be it known that I, WILLIAM BEATSON, a subject of the Queen of Great Britain, and resident of Ash Mount, Rotherham, in the county of York, England, have invented certain new and useful Improvements in Recovering Tin from Waste Tinned Iron; and I do hereby declare that the following is a full, clear, and exact description thereof.

It was proposed some years ago to recover tin from waste tinned iron by the joint action of an electric current passing through the waste material while in a hot solution of caustic soda; but the process has not been carried into general use, partly from the practical difficulty of handling and turning over the scrap, which, as usually met with in the market, is tangled and involved in twisted and curled masses.

The object of my invention is to produce means for recovering tin from waste tinned iron by the combined action of a chemical solution and electricity.

My invention consists of a tank or boiler containing one or more rotating gauze-cylinders connected to a positive pole of a battery, and a properly-prepared solution, which is heated by means of steam-pipes. The said tank is provided with a cover, to the under side of which are attached one or more depositing-plates connected to the negative pole of a battery and extending downward into the tank between the said cylinders.

In order to more fully describe my invention, I will refer to the accompanying drawings.

Figure I is a sectional elevation of my apparatus. Fig. II is a cross-section of the same on line *x x*, Fig. I. Fig. III is a plan sectional view of the same on line *y y*, Fig. II.

Similar letters refer to similar parts throughout the several views.

A represents the tank or boiler, with bottom and sides. B B are wire-gauze cylinders supported and rotated on the shaft *b*, suspended within the tank on bearing-brackets C C, which are fastened to the under side of the lid or cover D. One end of this axle *b* is provided with a cog-wheel, E, which is acted upon by the small worm-wheel *e*, attached to shaft *f*, suspended from cover D by brackets *d d*. This shaft *f* extends outside of the tank, and may have a crank or any other suitable means for turning the same. By turning this axle the cylinders B B can be rotated entirely or partially, at pleasure. Into this tank is placed a solution consisting of thirty (30) pounds of caustic soda or potash and five (5) pounds of cyanide of potassium or sodium to about ten (10) gallons of water. In order to keep this solution warm, (which is necessary,) I place in the bottom of the tank a coil or number of coils (as the case may be) of pipe, G, into which I force steam. To the under side of the cover D are suspended on hangers *g g* the depositing-plates H H, placed at each end of the tank and between the cylinders B B, and they extend down into the tank a little below the said cylinders.

The cylinders B B are made of wire-gauze, and are provided with a door or lid, *p*, to insert and remove the material placed therein. These cylinders are connected to the anode or positive pole of the battery or dynamo at *h*.

The depositing-plates H H are connected with the negative pole or cathode of a battery or dynamo at *m*. The depositing-plates are provided with slots to permit them passing over the axle *b*.

The operation of my invention is as follows: The tank A is first filled with the above-named solution to line *o*. The cylinders B B are half filled with the waste tinned iron, which is cut up into small pieces of about half an inch to two inches square. The lid D with depositing-plates H and cylinders B are then placed on top of the tank, as shown in Fig. 1. The cylinders B are then connected to positive pole and depositing-plate H to negative pole, and while this electric current is passing through the cylinders and plates the said cylinders B are slowly rotated by crank on shaft *f*. The tin or wasted tinned iron in the cylinders B, becoming dissolved by the solution, passes out of the gauze of the said cylinders and deposits itself upon the surface of the plate H. When a sufficient amount of loosened tin has been deposited on the plates H, the cover is removed and the axle removed from the bearings. When this is done it leaves the plates free to be scraped of their deposited tin.

By this combined arrangement of solution and electricity I am able to extract tin from waste tinned iron in a cheaper, easier, and quicker manner.

I am aware of the patent to Keith, No. 179,658, July 11, 1876, for utilizing tin scraps, wet processes, wherein a solution is used consisting of caustic soda, nitrate of soda, caustic potash, and nitrate of potash, placed in a tank containing a revolving cylinder, and therefore I do not claim any of these parts; but What I do claim is—

In an apparatus for recovering tin from waste tinned iron by the combined use of a chemical solution and electricity, the combination of the tank or boiler A, containing the steam-pipes G, the cover D, having suspended therefrom the gauze-cylinders B on axle $b$, supported in bearing-brackets C C, cog-wheel E, worm-wheel $e$, and crank-shaft $t$, said gauze-cylinders being connected to the positive pole of a battery or dynamo, and the depositing-plates H H, placed between said cylinders and connected to the negative pole of a battery or dynamo, all arranged and combined substantially as and for the purpose set forth.

In testimony that I claim the foregoing I have hereunto set my hand this 8th day of January, 1885.

WILLIAM BEATSON.

Witnesses:
SYDNEY SMITH,
W. P. SMITH.